though the fluid or gas medium referred to throughout the above description is air it will be appreciated that any other suitable fluid or gaseous medium could be employed in the operation of the drive unit.

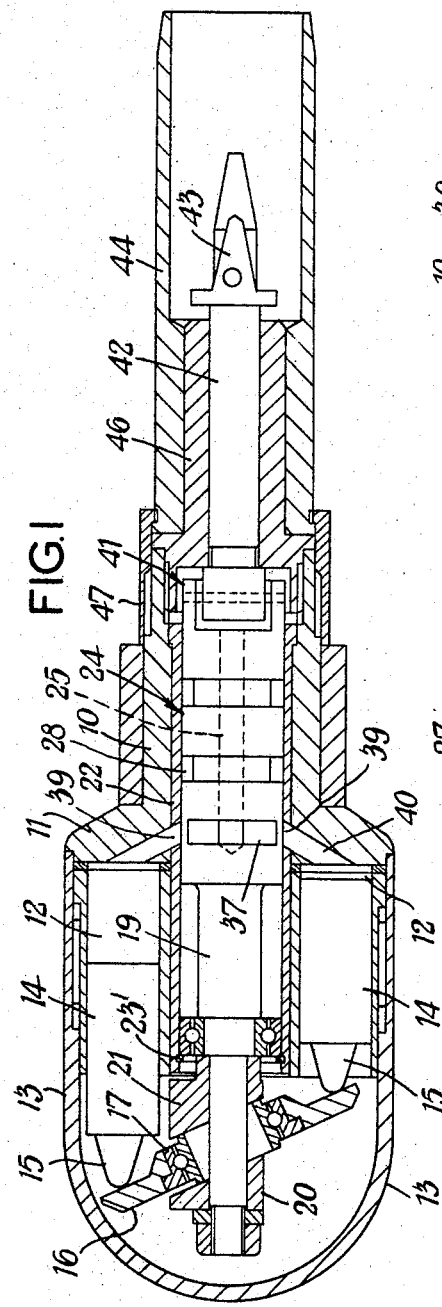

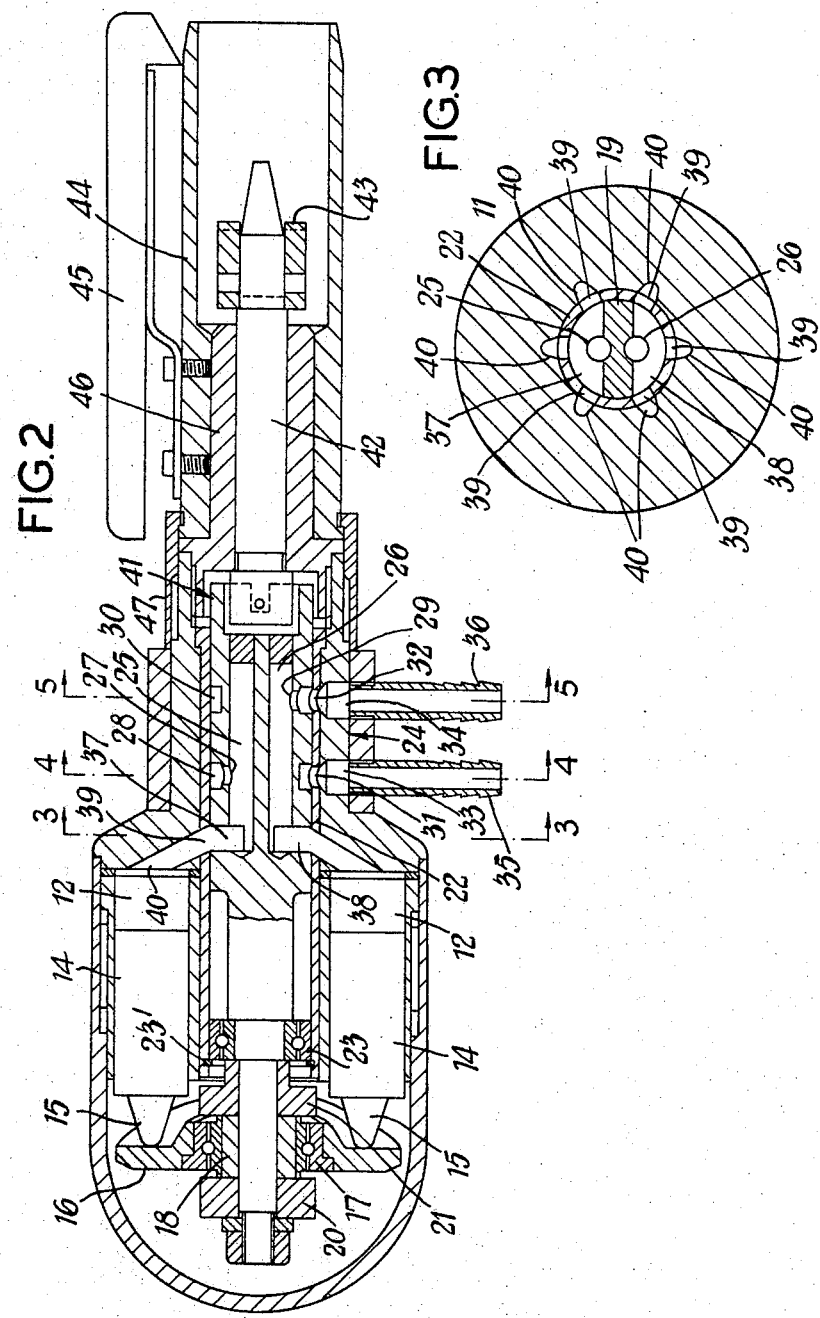

United States Patent Office 3,353,450  
Patented Nov. 21, 1967

3,353,450  
FLUID DRIVEN MOTOR UNIT FOR A DENTAL APPARATUS  
Herbert Percy Killick and Percy Hawtin, Blackpool, Lancashire, England, assignors to The Dental Manufacturing Company Limited, Blackpool, England, a British company  
Filed May 10, 1965, Ser. No. 454,317  
Claims priority, application Great Britain, July 6, 1964, 27,831/64  
2 Claims. (Cl. 91—175)

This invention is concerned with means for driving dental handpieces.

Hitherto conventional slow speed dental handpieces have been driven from a dental engine which is a relatively expensive and cumbersome or bulky piece of equipment incorporating an electric motor and an articulated arm serving to support a belt or cord drive by means of which the requisite drive is imparted to the handpiece.

It is the chief object of the invention to evolve a compact and effective drive unit which will obviate the necessity for the employment of a conventional dental engine and in accordance therewith it is proposed to provide a drive unit adapted to be releasably connected to a dental handpiece, such unit comprising a gas or fluid operated motor of the fixed angle swash plate type having an output or drive shaft and means associated with said shaft whereby it may be drivingly coupled to the driven shaft of a dental handpiece as and when required. Preferably the construction will be such that the unit may be readily removably attached to any selected conventional or appropriate dental handpiece as and when required.

In order that the nature of the invention may be more readily understood reference will now be made to the accompanying drawings which show one embodiment by way of example and in which:

FIGURE 1 is a longitudinal sectional view of a drive unit for application to a conventional low speed dental handpiece, FIGURE 2 is a view similar to that of FIGURE 1 the section however being taken in a plane at right angles to that of FIGURE 1, FIGURES 3, 4 and 5 are respective sectional views on the lines 3—3, 4—4 and 5—5 of FIGURE 2.

Referring now to the drawings 10 denotes a cylindrical sleeve like casing member which is formed at one end with a radially directed flange 11 serving to support a block incorporating a number of cylinders 12. In the embodiment illustrated there are six cylinders which are equidistantly angularly disposed about the central or longitudinal axis of the unit. 13 denotes a cup like casing which may be threaded or otherwise secured on the flange 11. Each cylinder 12 accommodates a freely slidable piston 14 having an axially directed nose or projection adapted to cooperate with a fixed angle swash plate 16 at its outer flat peripheral surface, thereby giving rise to a frictional rolling motion between the end of the piston projection 15 and the outer peripheral surface of the swash plate 16. The plate 16 is rotatably journalled by means of bearings 17 on a hub member 18 which is located on a drive or output shaft 19 by means of appropriately shaped collars 20, 21. The shaft 19 is freely rotatably supported within a sleeve 22 by means of an anti-friction bearing 23 and also by virtue of the provision of a part designated generally by 24 of increased diameter such part being adapted to form an air control or distributor valve member. In the embodiment illustrated the bearing 23 is retained in place against a shoulder on the shaft 19 by means of a circlip 23'. As will be seen the part 24 is formed with two axially directed bores 25, 26 the bore 25 communicating via a port 27 with an annular groove 28 while the bore 26 communicates via a port 29 with an annular groove 30. The grooves 28 and 30 are respectively in register with apertures 31, 32 in the sleeve 22 such apertures providing communication with ports 33, 34 respectively. 35 and 36 denote connections being adapted to communicate with the aforesaid ports 33, 34.

As will be seen the passages 25, 26 in the part 24 are closed at one end but communicate at the other respectively with slots 37, 38 which are in turn adapted to communicate via ports 39 in the sleeve 22 with passages 40 leading to the cylinders 12.

It will be appreciated that on supply of air under pressure through, for example, the connection 35 the pistons 14 will by virtue of their cooperation with the swash plate 16 be caused to reciprocate and to impart a drive to the shaft 19, the part 24 functioning as an air distributor or control valve which will be effective to ensure supply of air successively to the cylinders and also discharge of exhaust air through the connection 36. Assuming that air is supplied to the connection 35 it will flow via the port 33, aperture 31, groove 28 and port 27 into the passage 25 whence it will pass via the slot 37 through successive ports 39 and passages 40 to the cylinders 12. Air exhausted from the cylinders will flow via passages 40, ports 39 and slot 38 to the passage 26 and thence by way of port 29, groove 30, aperture 32 and port 34 to the connection 36. Clearly if desired air could be admitted via the connection 36 and exhausted through the connection 35 and by the incorporation of the air lines of a suitable valve it will be possible to arrange for switching of the air supply from one connection to the other thereby to allow for a reversal of the direction of drive when so required. Furthermore by means of an appropriate regulating device controlling the flow of air to the selected inlet connection it will be possible to control the speed at which the shaft 19 is driven.

As will be seen the shaft 19 is coupled at 41 to a shaft 42 carrying a clutch or coupling member 43 adapted to be engaged with a cooperating member on the driven shaft of a dental handpiece on application of the latter over a sleeve 44. 45 denotes a resilient retaining clip adapted releasably to lock the drive unit to a dental handpiece when the latter is properly positioned on the sleeve 44 and the member 43 is drivingly engaged with the cooperating member on the driven shaft of said handpiece. The sleeve 44 is rotatable with its supporting member 46 and is retained in place by means of an outer locking sleeve 47. Since the sleeve 44 and the retaining clip 45 are rotatably attached to the drive unit the dental handpiece may be turned about its axis while the said drive unit is maintained stationary, there being freedom of movement without torsional drag.

It will be appreciated that a drive unit such as is described above may be readily coupled and removed from any conventional or appropriate dental handpiece as and when required. Furthermore the drive unit which is small and compact will obviate the necessity for the conventional dental engine with its electric motor, articulated arm, cord drive, foot controller and so on, and the only ancillary equipment that will be necessary will be air supply and exhaust lines, possibly a manually or foot operated change over valve to allow for reversal of the direction of drive and a speed controller for controlling the flow of air to the unit. The speed controller may well be a small and compact device which may be integral therewith.

The unit above described will provide a good driving torque particularly at slow speeds of rotation which has not been possible with the types of drive hitherto employed for dental handpieces. With the conventional arrangements considerable slip is experienced, particularly at low speeds and that fault is substantially obviated when a unit according to the present invention is employed.

We claim:
1. A drive unit to which a dental handpiece may be removably connected, said unit comprising:
- a housing,
- a fluid operated motor having a fixed angle swash plate, said motor being mounted within said housing,
- a gaseous fluid supply source connected to said motor which delivers to said motor on demand a supply of said fluid,
- said swash plate having a plurality of pistons operatively acting upon its outer peripheral surface,
- said pistons being longitudinally disposed within said motor and having an axial projection from one end thereof, providing a frictional contact between said axial projection and said swash plate,
- a drive shaft connected to a hub member,
- said hub member being an integral part of said swash plate and operatively connected thereto by bearing members, thereby allowing said shaft to rotate when said pistons are linearly moved by the gaseous fluid, and
- a stationary locating sleeve disposed about said drive shaft, means for securing said locating sleeve at one end to said housing, and resilient locking means mounted on said locating sleeve, whereby a dental handpiece may be drivingly connected to said drive unit.

2. The apparatus set forth in claim 1 wherein said securing means comprises a locking sleeve fixedly secured at one end to said housing, the other end of said locking sleeve being coupled to said locating sleeve for retaining said locating sleeve in a fixed relation with said housing and for permitting rotation thereof independently of said drive shaft and housing.

References Cited
UNITED STATES PATENTS

| | | | |
|---|---|---|---|
| 1,483,199 | 2/1924 | Schinkez | 91—198 |
| 1,913,003 | 6/1933 | Shaff | 91—180 |
| 2,169,456 | 8/1939 | Wahlmark | 92—71 |
| 2,392,980 | 1/1946 | Fowkes | 92—71 |
| 2,543,134 | 2/1951 | Smith et al. | 91—180 |
| 3,246,575 | 4/1966 | Raymond | 91—180 |
| 3,272,079 | 9/1966 | Bent | 91—180 |

EDGAR W. GEOGHEGAN, *Primary Examiner.*

PAUL E. MASLOUSKY, MARTIN P. SCHWADRON, *Examiners.*